United States Patent [19]

Kammiller et al.

[11] Patent Number: 4,493,017

[45] Date of Patent: Jan. 8, 1985

[54] SINGLE DRIVE TRANSFORMER WITH REGENERATIVE WINDING FOR P.W.M. SUPPLY HAVING ALTERNATELY CONDUCTING POWER DEVICES

[75] Inventors: Neil A. Kammiller, Lakewood; Nedyalko V. Ivanov, Lorain, both of Ohio

[73] Assignee: Reliance Electric Company, Cleveland, Ohio

[21] Appl. No.: 460,368

[22] Filed: Jan. 24, 1983

[51] Int. Cl.³ .......................................... H02M 7/537
[52] U.S. Cl. ....................................... 363/132; 363/98; 323/289
[58] Field of Search ................. 363/17, 56, 98, 132; 323/289; 307/300

[56] References Cited

U.S. PATENT DOCUMENTS

| 3,737,755 | 6/1973 | Calkin et al. | 363/17 |
| 3,828,208 | 8/1974 | Kelleher | 323/289 X |
| 4,093,877 | 6/1978 | Pollmeier | 323/289 X |

FOREIGN PATENT DOCUMENTS 169662  3/1965  U.S.S.R. .......................... 323/289

OTHER PUBLICATIONS

R. E. Schroeder, "Analysis and Design of a Highly Efficient Power Stage for an 18-KHz, 2.5-KW DC—DC Converter", PESC '81 IEEE, Power Electronics Specialists Conference, Boulder, Co., U.S.A., (Jun. 29–Jul. 3, 1981), pp. 273–283.

Primary Examiner—Peter S. Wong
Attorney, Agent, or Firm—Michael M. Rickin

[57] ABSTRACT

A drive transformer for use in a p.w.m. power supply which has alternately conducting power switching devices. The single transformer includes a primary winding, a secondary winding and a regenerative winding. When one of the devices finally becomes nonconductive the other of the devices may turnon. The regenerative winding aids the conduction of that device and also reinforces the drive signal to the device which receives from the drive circuitry of the supply a turnon drive signal.

9 Claims, 8 Drawing Figures

SINGLE DRIVE TRANSFORMER WITH REGENERATIVE WINDING FOR P.W.M. SUPPLY HAVING ALTERNATELY CONDUCTING POWER DEVICES

BACKGROUND OF THE INVENTION

1. Field of the Invention

The present invention relates to that type of switching power supplies which uses pulse width modulated signals as the drive signals to the even number of power switching devices included therein and more particularly to the drive transformer for use therewith.

2. Description of the Prior Art

Telephone central offices use d-c voltages for a variety of functions. These d-c voltages may by supplied directly from a bank of batteries which are charged by a battery charger or from a power supply which converts the commercially available 60 Hz voltage from the electrical utility into a d-c voltage of proper amplitude thus eliminating the batteries or from a d-c to d-c converter which receives its input voltage from the batteries.

In the past it was common for converters, chargers and eliminators to be designed so that their power circuitry and control circuitry operated at the 60 Hz frequency of the commercially available a-c voltage. In order to reduce the size, cost and objectionable noise that ordinarily are associated with supplies operating at 60 Hz it has now become common for such supplies to operate at a frequency above the audible range. Selection of such a high operating frequency has the desirable characteristic of reducing the size of the supply and any transformers therein which results in a savings of both component costs and supply weight and, in addition, the supply no longer generates audible noise.

Many types of high frequency converters, chargers and eliminators now make use of the well-known pulse width modulation (p.w.m.) technique to provide a p.w.m. signal to drive one or more power switching devices at the relatively high frequency. The p.w.m. technique usually makes use of a sawtooth waveform of predetermined frequency for purposes of generating the drive signal to the power switching devices. Typically the frequency of the sawtooth waveform is in the order of 40 KHz when the supply has two or more alternately conducting power switching devices arranged, for example, in a half bridge or full bridge configuration.

The p.w.m. drive signals are connected to the power switching devices by a drive transformer. It has also been common in such arrangement to include in the drive transformer a means to provide regenerative drive to the power switching device being turned on by its associated drive signal. Regeneration, as is known in the art, aids and reinforces that turnon. Where the supply includes an even number of power switching devices which conduct alternately, it is the practice in the art for each such device to have its own drive transformer. The use of separate drive transformers provides isolation between the alternately conducting power devices. It was thought that such p.w.m. driven, alternately conducting power devices could not share a single drive transformer.

It was then recognized that such devices could share a single drive transformer without any detrimental effect. It was further recognized that the single drive transformer could include a regenerative winding which would also be shared by the alternately conducting power switching devices. It was additionally recognized that such an arrangement would not only not have any detrimental effect on the operation of the power switching devices and by the regenerative winding aid the turnon of the then off device, but would also substantially improve the turnoff of the then conducting device.

SUMMARY OF THE INVENTION

In accordance with the present invention there is provided a single drive transformer for use in a switching power supply of the type which provides through the transformer driver signals to alternately conducting power switching devices. The driver signals initiate the turnon and turnoff of the devices.

The single drive transformer comprises a primary winding which is connected to receive the driver signals from the driver circuitry in the supply. Also included is a secondary winding which is connected to the alternately conducting power switching devices. By transformer action the secondary winding provides in response to the driver signals on the primary winding a signal proportional to the driver signals. The transformer also includes a regenerative winding. This winding is connected to the alternately conducting devices in a way such that it reinforces the driver signals when those signals initiate turnon of the then nonconducting device. This reinforcement aids that turnon. The regenerative winding also aids the conduction of that one of the devices which was nonconducting. That device is momentarily turned on when the other of the devices which was previously conducting becomes nonconductive in response to driver signals initiating its turnoff.

DESCRIPTION OF THE PREFERRED EMBODIMENT

Figure 1:
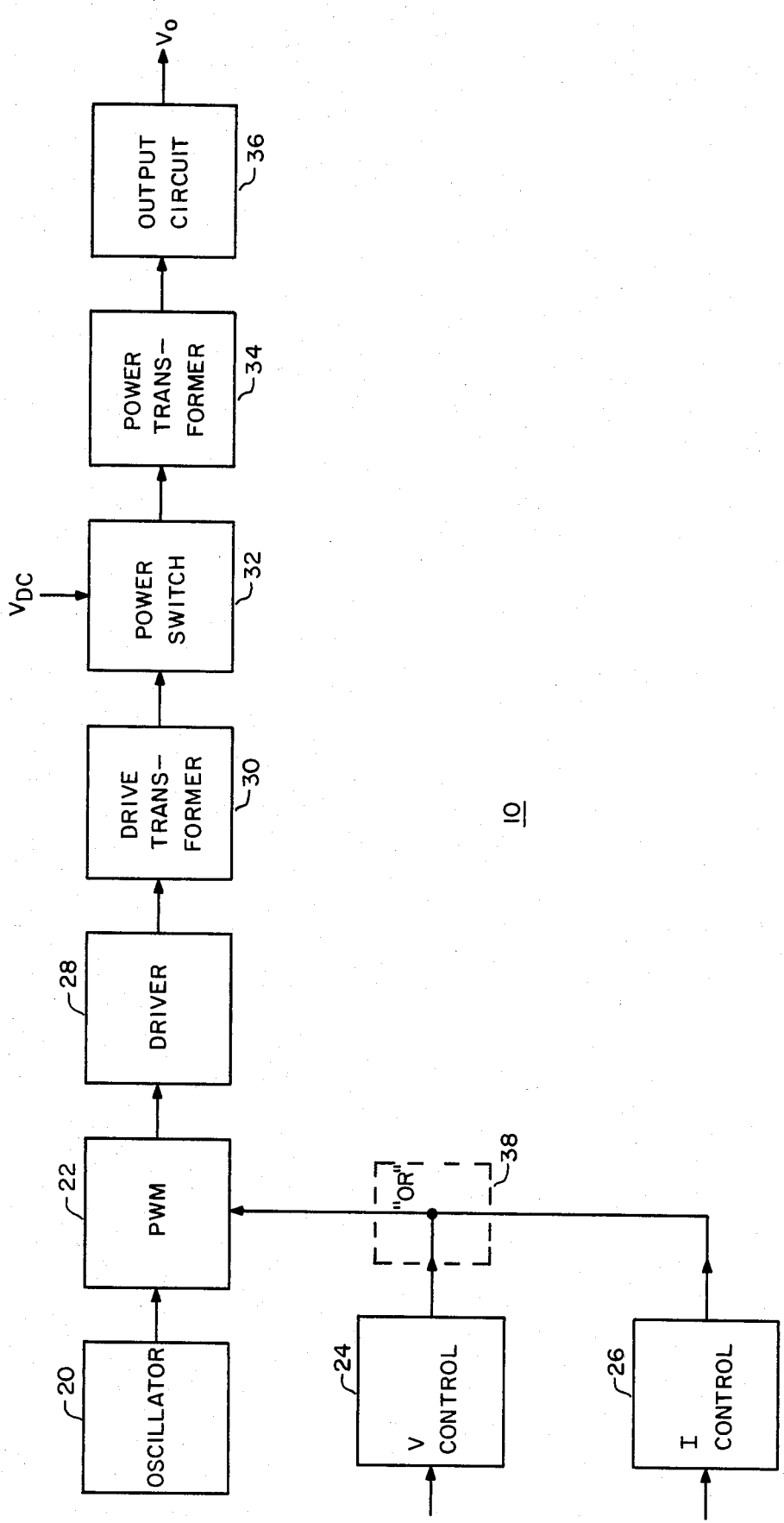
FIG. 1 is a block diagram of a typical power supply in which the drive transformer of the present invention may be used.

Referring to FIG. 1 there is shown a block diagram for a typical embodiment of the d-c to d-c converter portion of a switched mode power supply 10. Supply 10 may also include a rectifier and capacitor bank (not shown) to obtain an unregulated d-c voltage, hereinafter referred to as the bank voltage and designated as $V_{DC}$, from the commercial a-c voltage. The bank voltage may also be obtained directly by connecting the input of the supply to a bank of batteries. Supply 10 has a d-c to d-c converter portion which is of the type wherein a power switch 32 is turned on and off by the use of the well-known pulse width modulation (p.w.m.) technique to thereby provide a d-c output voltage, designated as $V_o$, from the d-c bank voltage $V_{DC}$. The supply is of the type wherein the p.w.m. signals are used directly to drive the power switching devices. For ease of description, the circuit of FIG. 1 will be referred to as a supply independent of the manner in which the bank voltage is obtained.

The operation of supply 10 is controlled as a function of either its output voltage or current in the power switch 32. Supply 10 includes a circuit (not shown) which is used to monitor the current in the power switch 32. As is well known in the art, it is desirable to monitor the current in the power switch so as to be able to control the switching of switch 32 in the event that excessive current should flow therein. The current in switch 32 may be monitored by a transformer. The sensing transformer is connected to a circuit 26 which first generates a d-c signal which is representative of the current being monitored. Circuit 26 then compares that d-c signal to a predetermined reference signal.

Supply 10 must also monitor its output voltage, Vo, to maintain regulation thereof. A sensing circuit (not shown) is used to provide a sample of Vo to circuit 24 which compares two voltages. One of the voltages compared by circuit 24 is simply a voltage proportional to Vo and may be obtained by use of a resistive voltage dividing network having Vo as its input voltage. The other voltage compared by circuit 24 is a reference voltage which may be provided by the combination of a zener diode and a resistive network including an adjustable resistor.

Each of the outputs of circuits 26 and 24 are provided as inputs through OR circuit 38 to p.w.m. comparator circuit 22. The output of supply 20 is then controlled by circuit 22 as a function of either the output voltage or the current in power switch 32. An oscillator circuit 20 provides the waveform usually in the form of a sawtooth, which circuit 22 uses in its comparison. The p.w.m. signals generated by circuit 22 may either be connected directly by driver 28 and drive transformer 30 to provide the drive for power switch 32 or may be used by driver 28 to deriver proportional phase shifted squarewaves which are then connected by transformer 30 as the drive signals for power switch 32. Where supply 10 is of the type which directly uses the p.w.m. signals as the drive for the power switch, then circuits 20, 22, 24, 26 and 28 may be embodied by an integrated circuit chip such as type 494 which is available from manufacturers such as Texas Instruments or Motorola.

Figure 2:
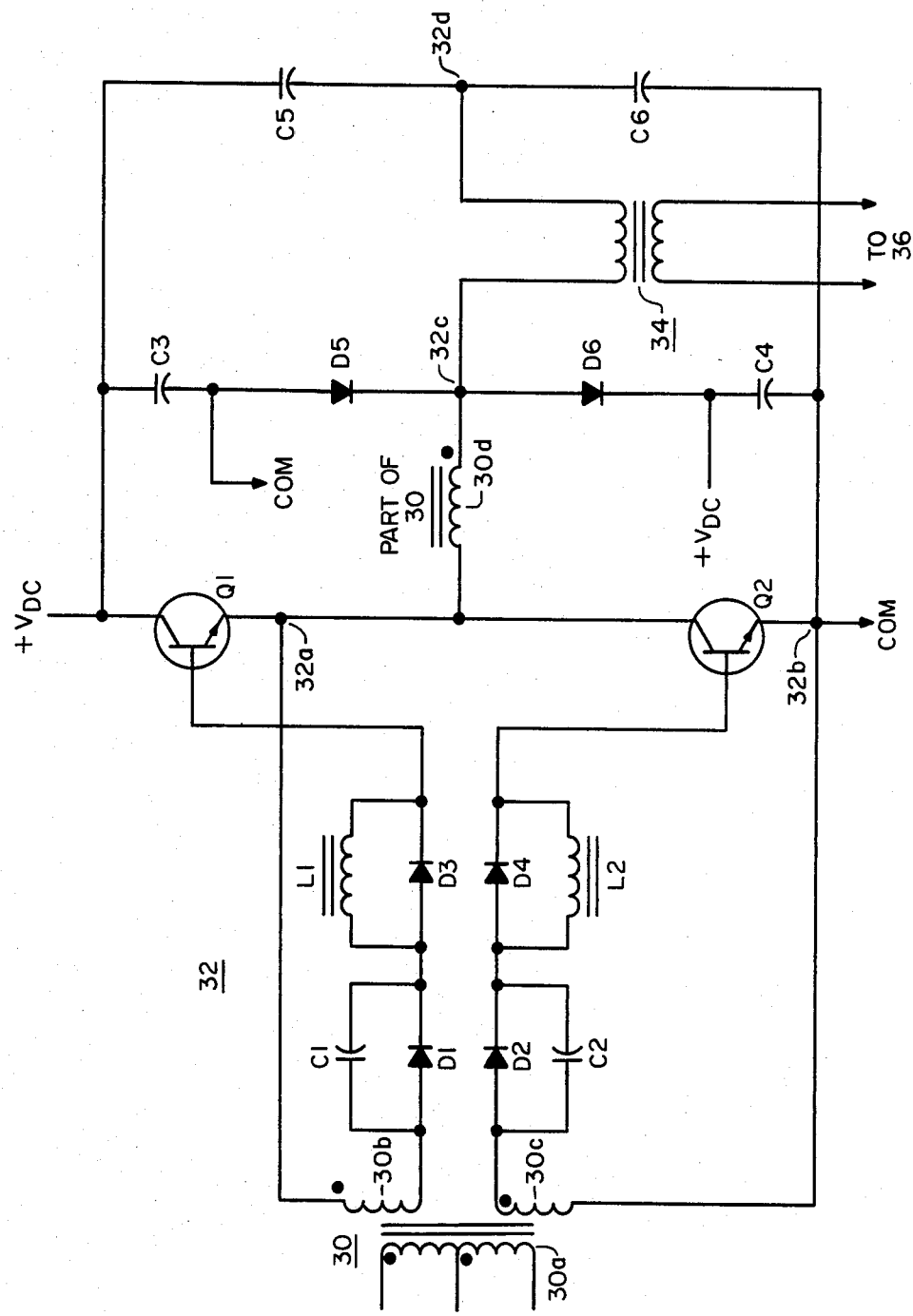
FIG. 2 is a schematic diagram of the drive transformer of the present invention and also includes typical circuitry for the power switch devices and power transformer of the supply shown in FIG. 1.

Supply 10 also includes a power transformer 34 whose primary winding is connected in series combination with switch 32. Connected to the secondary winding of the power transformer is the output circuit 36 which usually includes both a rectifier and a filter. The circuitry used to embody switch 32 and transformers 30 and 34 is shown in FIG. 2 to be described hereinafter. Output circuit 36 may be embodied by the combination of a fullwave rectifier and an L-C filter in which the inductor is in series with the rectifier. The rectifier may then be embodied by using a power transformer having a center tapped secondary winding in combination with a diode arrangement which allows some of the energy stored in the inductor filter to be transferred to the load during the interval when the power switch is off.

The circuitry used to embody driver 28 while not shown in FIG. 1 may be the combination of push-pull switched current sources and an active clamp. The current sources supply the turnon drive current for that one of the power switching devices which is being turned on. The current sources also supply the magnetization current for the drive transformer. The active clamp provides a low impedance across the drive transformer during the off time of the drive pulse. The low impedance initiates the turnoff of the then conducting one of the power switching devices in the manner to be described hereinafter.

Referring to FIG. 2 there is shown a circuit diagram for drive transformer 30, power amplifier 32 and power switch 34 of FIG. 1. Drive transformer 30 includes transformer 30 of FIG. 1. Drive transformer 30 includes a center tapped primary winding 30a which is connected to receive the drive signals from driver 28 of FIG. 1. Transformer 30 also includes secondary winding 30b, the dotted end of which is connected to the junction 32a of the emitter of power switching transistor Q1 and the collector of power switching transistor Q2. The nondotted end of winding 30b is connected to the anode of a diode D1. The transformer also includes secondary winding 30c, the dotted end of which is connected to the anode of a diode D2 and the nondotted end of which is connected to the junction 32b of the emitter of transistor Q2 and circuit common (COM). Finally, drive transformer 30 includes a winding 30d, one end of which is connected to the junction 32a and the other end of which is connected at the junction 32c to the primary of power transformer 34. The winding 30d is used to provide regeneration in supply 10 in the manner to be described hereinafter.

Power amplifying circuit 32 includes first and second switching transistors Q1 and Q2, respectively. Transistor Q1 has its collector connected to a source of positive d-c voltage designated as $+V_{DC}$. The emitter of the transistor is connected to junction 32a and the base is connected to the cathode of a diode D3. Previously described diode D1 and diode D3 are connected in series as shown in FIG. 2. A capacitor C1 is connected across diode D1 and an inductor L1 is connected across diode D3. This combination of diodes, inductor and capacitor provides a reservoir of stored charge and a means for ensuring turnoff of transistor Q1 at the end of its conduction period.

Power amplifier 32 also includes power switching transistor Q2, the collector of which is connected to junction 32a and the emitter of which is connected to junction 32b and therefore to COM. The base of the transistor is connected to the cathode of a diode D4 which is in series relationship with previously described diode D2. A capacitor C2 is connected in parallel across diode D2 and an inductor L2 is connected in parallel across diode D4. The combination of diodes D2-D4 and elements L2-C2 provides a reservoir of stored charge and a means for ensuring turnoff of transistor Q2 at the end of its conduction period.

The series combination of a capacitor C3 and a diode D5 (poled as shown) is connected between the collector of transistor Q1 and junction 32c. One end of capacitor C3 is connected to the collector of the transistor and the other end of the capacitor is connected to the anode of diode D5. The junction of the anode of the diode and its associated end of capacitor C3 is connected to COM. The series combination of a capacitor C4 and a diode D6 (poled as shown) is connected between COM and junction 32C. One end of capacitor C4 is connected to COM and the other end of the capacitor is connected to the cathode of diode D6. The junction of the cathode and its associated end of capacitor C4 is connected to the source of positive d-c voltage, $+V_{DC}$.

The junction 32c of the cathode of diode D5 and the anode of diode D6 is connected to one end of the primary winding of power transformer 34. The other end of the power transformer primary winding is connected at the junction 32d to capacitors C5 and C6. Capacitor C5 is connected between the collector of transistor Q1 and junction 32d, whereas capacitor C6 is connected between the junction and COM. The voltage at junction 32d is always one-half the bank voltage, $+V_{DC}$. The secondary winding of power transformer 34 is connected to the output rectifying and filtering circuitry 36 normally included in a switching power supply.

The manner in which the circuit shown in FIG. 2 operates will now be described with reference to that figure and the various current and voltage waveforms shown in FIG. 3. The driver signals received at the primary winding of transformer 30 are pulses whose width is controlled as a function of either the output voltage of the supply or current in the power switch. Each of the power switching transistors conduct for a period of time which is essentially equal to the width of its associated driver pulse. In the interval between the end of one driver pulse and the start of the next pulse both of the transistors are, except as discussed below, nonconductive.

For ease of the description of the circuit's operation, assume that transistor Q1 is conducting and transistor Q2 is nonconductive. In that case, dotted ends of windings 30b and 30c have a negative polarity and their nondotted ends have a positive polarity. The current flowing in the base of Q1, the voltage proportional to the driver voltage across transformer 30 for Q1, the voltage across the base to emitter of Q1 and the voltage across the base to emitter of Q2 during the time that Q1 is conductive and Q2 is nonconductive are shown in FIGS. 3(a), (b), (c) and (d), respectively.

Diode D1 is conductive during the interval of time that Q1 is conductive. The diode controls the voltage on capacitor C1 to some predetermined amplitude. The capacitor, as will be described hereinafter, is used as a source of charge for turning off transistor Q1 at the end of its drive pulse. At the beginning of the next driver pulse for Q1, the capacitor recharges and the diode D1 limits the voltage to which the capacitor charges. While diode D1 is shown as only a single diode, it should be appreciated that the diode may be embodied by the combination of a multiple number of diodes connected in series. Diode D3 is nonconductive at this time. This diode conducts only momentarily when transistor Q1 is first turned on at the beginning of its associated driver pulse. During the remainder of the time the Q1 is on, the voltage across D3 is insufficient to support its conduction.

Figure 3:
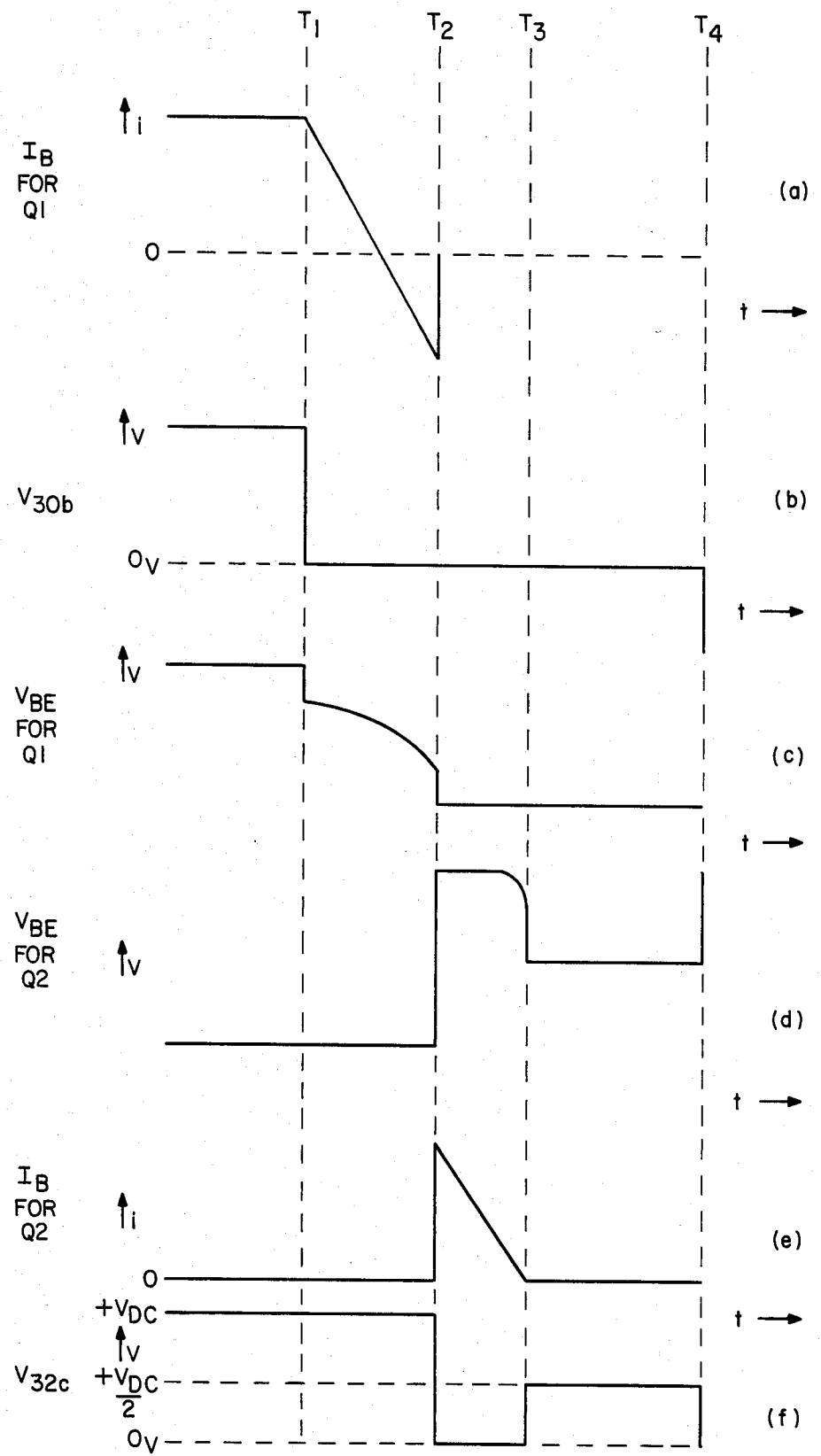
FIGS. 3(a) to (f) are waveforms showing various ones of the currents and voltages associated with the schematic diagram of FIG. 2.

At the end of its driver pulse which is designated in FIG. 3 by the time T1, turnoff of transistor Q1 is initiated. Capacitor C1 contains the reservoir of stored charge which in combination with linear inductor L1 provides a current to the base of Q1 which changes linearly with time. This linearly changing current, which is shown in FIG. 3 (a), allows a controlled turnoff of Q1 to occur by removing in a linear manner the charge stored in the base of the transistor when it was conducting. At the time designated as T2 the collector current (not shown) of the transistor Q1 begins to fall. Prior to time T2 the collector current remained substantially constant. When the collector current falls to essentially zero the transistor is completely turned off. The fall in collector current takes about 100 nanoseconds. When the transistor turns off, the series combination of capacitor C3 and diode D5 ensures that the voltage across the transistor does not rise above the bank voltage $+V_{DC}$.

The transistor is therefore completely turned off shortly after the time T2. The controlled turnoff of Q1, therefore, occurs essentially over an interval of time (T2-T1) which is in the order of two (2) microseconds. This relatively short interval between the initiation of turnoff and its occurrence ensures that the transistor turns off as quickly as possible. The speed with which the transistor turns off is affected by the rate of change of current in its base during turnoff.

Prior to the actual turnoff of Q1, current was flowing in the primary winding of the power transformer 34 from junction 32c to junction 32d. This current cannot stop flowing instantaneously now that Q1 is turned off. A new path must then be provided for the flow of that current. This new path is provided by diode D5 and transistor Q2 which conducts momentarily in the manner to be described hereinafter. When transistor Q1 turns off, the linear inductance associated with the primary of transformer 34 causes the current in that winding to decay linearly with time. While the transistor Q1 turned off in the order of 100 nanoseconds from the time T2, it takes the current in the primary winding of transformer 34 about one to two microseconds to decay. As the current falls linearly toward zero, diode D5 provides a path for that decaying current.

During the time transistor Q1 had been conducting and turning off, transistor Q2 was nonconductive. At the time T2 transistor Q2 receives a turnon drive signal in the form of a pulse at its base. This pulse is provided by the energy stored primarily in the series inductance of the transformer 30. This turnon of Q2 is illustrated in FIG. 3(d) and in FIG. 3(e) wherein the base to emitter voltage and the base current, respectively, for that transistor are shown. From a comparison of FIGS. 3(a) and 3(e) it is clear that the current flowing in the base of Q1 at time T2 has transferred to the base of Q2.

When transistor Q1 was conducting, the base to emitter voltage across Q2 was the sum of the voltage across capacitor C2 and the voltage across the winding 30c. During that interval of time these voltages are in aiding relationship. Capacitor C2 provides the reservoir of charge which is used for a controlled turnoff of Q2 at the end of its associated drive pulse. When Q2 turns on, its base to emitter voltage rises as shown in FIG. 3(d). Transistor Q2 will conduct collector current when the current through the primary winding of the transformer 34 reverses its direction of flow. When Q2 turns off at the time designated as T3 in FIG. 3, its base to emitter voltage falls to become equal to the voltage across the capacitor C2. As the driver pulse for transistor Q1 has ended and as the drive pulse for Q2 has not yet occurred, there is no voltage across winding 30a.

The base current in Q2 rises in an essentially instantaneous manner as a result of the essentially instantaneous fall of current in the base of Q1 at the time T2. As described above the energy stored primarily in the series inductance of the drive transformer 30 provides the turnon drive signal to Q2 at this time. The current then rapidly falls off to become zero at the time T3. The momentary turning on of Q2 provides a path for the current in the primary winding of transformer 34 if that current should reverse its direction of flow. The regenerative winding 30d of transformer 30 aids the conduction of Q2 at this time. The transistor will continue conducting until the current in the primary winding of power transformer 34 decays to essentially zero.

FIG. 3(f) shows the voltage at junction 32c to which one end of the primary winding of power transformer 34 is connected. This voltage can have either one of three possible amplitudes: $+V_{DC}$, $+\frac{1}{2} V_{DC}$, or zero. The voltage at junction 32d is always, by the action of capacitors C5 and C6, $+\frac{1}{2} V_{DC}$. When transistor Q1 is conducting, the voltage at 32c is $+V_{DC}$ and the voltage across the transformer primary voltage is $+\frac{1}{2} V_{DC}$. When transistor Q2 is conducting, the voltage at junction 32c is zero and the voltage across the transformer primary is $-\frac{1}{2} V_{DC}$. When neither of the two transistors is conducting, the voltage at the junction 32c is $+\frac{1}{2} V_{DC}$ and the voltage across the transformer primary is zero. Therefore, as shown in FIG. 3(f), up until the time T2, the voltage at the junction 32c is $+V_{DC}$.

At time T2 transistor Q2 is turned on to momentarily conduct until time T3. During that interval of time, the voltage at the junction 32c is essentially zero. When Q2 turns off, the voltage at junction 32c rises to $\frac{1}{2} V_{DC}$. The momentary conduction of Q2 just after Q1 has stopped conducting acts as a clamp with respect to the voltage at junction 32c. If Q2 were not to turn on when Q1 stopped conducting, the voltage at the junction would head toward $+\frac{1}{2} V_{DC}$ from $+V_{DC}$. The junction voltage would not instantaneously change from $+V_{DC}$ to $+\frac{1}{2} V_{DC}$ but would exhibit a waveform having oscillations whose amplitude would decrease with time. These oscillations are commonly referred to as "ringing". Therefore, the conduction of Q2 at time T2 clamps the junction voltage to thereby keep the voltage from exhibiting this ringing in its waveform. Upon the turnoff of transistor Q2 at time T3, the clamp is removed and the voltage at junction 32c rises to $+\frac{1}{2} V_{DC}$.

As described above, transistor Q1 turns off in about 100 nanoseconds after the time T2. Transistor Q2 momentarily turns on for a period of about one to two microseconds after Q1 has turned off. On the other hand, the on times associated with transistors Q1 and Q2 may be as high as twenty five microseconds as supply 10 normally runs at a frequency which is in the order of 20 Khz or higher. The time scales shown in the various waveforms of FIG. 3 have been enlarged in the intervals between the turnoff of Q1 and the turnon of Q2 at the next driver pulse.

It should be appreciated that the reason the voltage across the primary winding of power transformer 34 goes to zero when both transistors are not conducting is the manner in which the output circuits for supply 10 are embodied. As described previously for FIG. 1, these circuits may be embodied by using a center tapped secondary winding on the power transformer. Each end of the secondary winding is then connected to the anode of a respective one of two diodes. The cathodes of the diodes are both connected to one end of the inductor at the input to the output filter. The other end of the inductor is connected to one end of the filter capacitor. The center tap of the secondary winding is connected to the other end of the capacitor. When both transistors Q1 and Q2 are not conducting, the diodes conduct equal and opposite currents to develop essentially zero volts across the power transformer secondary winding. By transformer action, the voltage across the primary winding is then essentially zero volts when both Q1 and Q2 are not conducting.

Upon the generation of the next driver signal by driver 28, transistor Q2 will be turned on. Regenerative winding 30d aids the turnon of Q2 by providing additive current to the base of the transistor. The use of the regenerative winding reduces the requirements ordinarily placed on driver 28 to supply current for the turnon of either transistor Q1 or Q2. In fact where a p.w.m. switching power supply was constructed using the present invention, the drive current required to turn on the transistors was about one-third ($\frac{1}{3}$) of what would have been required if a regenerative winding had not been used. The use of the regenerative winding has, therefore, reduced the function of driver 28 to be little more than that of providing the initial base drive current for the transistor being turned on. The remainder of the current needed to turn the transistor on is provided by the regenerative winding.

With power switching transistor Q2 now conductive and transistor Q1 now nonconductive, circuits 30, 32 and 34 operate in the same manner as they did when Q1 was conductive and Q2 was nonconductive. For this reason, waveforms associated with the period of time for which Q2 is conductive and its subsequent turning off are not shown in FIG. 3. At the end of its associated driver pulse, turnoff of Q2 will be initiated. Capacitor C2 will serve as a reservoir of stored charge that will be used by linear inductor L2 to provide a controlled turnoff of Q2. When Q2 turns off, its associated diode D6 and capacitor C4 will provide a clamp to inhibit the appearance of spikes across the transistor. The regenerative winding will aid the conduction of Q1 after it has received its turn on signal to therefore serve as a path for reversal of power transformer primary winding current in the same manner as did Q2 when it momentarily turned on and conducted after the turnoff of Q1.

In a supply 10 constructed in accordance with the present invention, the turnoff inductors L1 and L2 were embodied by the use of discrete linear inductors. They may also be embodied as part of the drive transformer. In that embodiment, the drive transformer primary winding had 26 turns, the secondary winding had eight (8) turns and the regenerative winding had one (1) turn. It should be appreciated that while not shown in FIG. 2 it may be necessary to connect snubbing circuits in the form of a series combination of a resistor and a capacitor in parallel with the C3-D5 and C4-D6 combination. It is to be understood that the description of the preferred embodiment is intended to be only illustrative, rather than exhaustive, of the present invention. Those of ordinary skill will be able to make certain additions, deletions, and/or modifications to the embodiments of the disclosed subject matter without departing from the spirit of the invention or its scope, as defined by the appended claims.

What is claimed is:
1. A single drive transformer for use in a switching power supply of the type which includes alternately conducting power switching devices, a driver circuit for generating p.w.m. driver signals for initiating the turnon and turnoff of said devices and power output means, said power switching devices being arranged to provide a current to said output means, said transformer comprising:
 (a) primary winding means connected to said driver circuitry to receive said p.w.m. driver signals;
 (b) secondary winding means connected to said alternately conducting power switching devices and responsive to said signals on said primary means to provide to each of said alternately conducting switching devices a signal proportional to said driver signals; and
 (c) regenerative winding means connected between said alternately conducting power devices and said power output means, said current flowing through said regenerative means in a manner such that said regenerative means provides through said secondary winding means a regenerative current to each of said devices, said regenerative current reinforcing said proportional signal when said driver signals initiate the turnon of the then nonconducting one of said devices.

2. The transformer of claim 1 wherein said power supply includes first and second alternately conducting power switching devices and said transformer secondary winding means includes first and second windings said first winding being connected to provide said proportional signal to said first power switching device and said second winding being connected to provide said proportional signal to said second power switching device.

3. The transformer of claim 2 wherein said secondary winding means includes first and second turnoff means for providing a controlled turnoff of said first and second power devices, respectively said first turnoff means being associated with said first winding and said second turnoff means being associated with said second winding.

4. The transformer of claim 1 wherein said driver circuitry provides said driver signals for initiating turnoff of the then conducting one of said alternately conducting devices and said secondary winding means includes means responsive to said turnoff initiation signals for providing a controlled turnoff of said conducting one of said alternately conducting devices.

5. The transformer of claim 1 wherein said secondary winding means includes a first winding, a second winding, a first turnoff means, a second turnoff means, said first winding and said first turnoff means being associated with one of said alternately conducting devices, said second winding and said second turnoff means being associated with the other of said alternately conducting devices, said power supply driver circuitry providing signals to initiate turnoff of the then conducting one of said power devices, said first and second turnoff means responsive to said turnoff signals for providing a controlled turnoff of the associated one of said devices which is conducting.

6. The transformer of claim 1 wherein said power output means includes a power transformer means and said regenerative winding means is connected between said alternately conducting power switching devices and said power transformer means.

7. The transformer of claim 6 wherein said power transformer means includes primary and secondary winding means and said regenerative winding means is connected between said alternately conducting power switching means and said primary winding means of said power transformer means.

8. A single drive transformer for use in a switching power supply of the type which includes alternately conducting power switching devices, a driver circuit for generating p.w.m. driver signals for initiating the turnon and turnoff of said devices and power output means which includes a power transformer means, said power switching devices being arranged to provide a current to said output means, said transformer comprising:
 (a) primary winding means connected to said driver circuitry to receive said p.w.m. driver signals;
 (b) secondary winding means connected to said alternately conducting power switching devices and responsive to said signals on said primary means to provide to each of said alternately conducting switching devices a signal proportional to said driver signals; and
 (c) regenerative winding means connected between said alternately conducting power devices and said power transformer means, said current flowing through said regenerative means in a manner such that said regenerative means provides through said secondary winding means a regenerative current to each of said devices, said regenerative current reinforcing said proportional signal when said driver signals initiate the turnon of the then nonconducting one of said devices.

9. The single drive transformer of claim 8 wherein said power transformer means includes first and second winding means and said regenerative winding means is connected between said alternately conducting power switching devices and said primary winding means.

* * * * *